United States Patent [19]

Betlejewski et al.

[11] 4,174,158

[45] Nov. 13, 1979

[54] BOWED SLIDE HANDLING APPARATUS

[75] Inventors: Frank W. Betlejewski, Elgin; Donald J. Peterson, Chicago, both of Ill.

[73] Assignee: Bell & Howell Company, Chicago, Ill.

[21] Appl. No.: 943,038

[22] Filed: Sep. 18, 1978

[51] Int. Cl.² ............................................. G03B 23/04
[52] U.S. Cl. ................................................. 353/113
[58] Field of Search .................... 353/95, 96, 113

[56] References Cited

U.S. PATENT DOCUMENTS

| | | | |
|---|---|---|---|
| 2,260,660 | 10/1941 | Darwin | 353/113 X |
| 3,926,514 | 12/1975 | Costanza et al. | 353/113 |

*Primary Examiner*—Charles E. Phillips
*Attorney, Agent, or Firm*—Aaron Passman; Roger M. Fitz-Gerald

[57] ABSTRACT

A device for transporting slides in a horizontal plane to be projected by a slide projector. More particularly, a retaining means adapted to tolerate bowed slides by having clearance grooves for receiving the bowed slides and for permitting same to set level thereupon.

5 Claims, 5 Drawing Figures

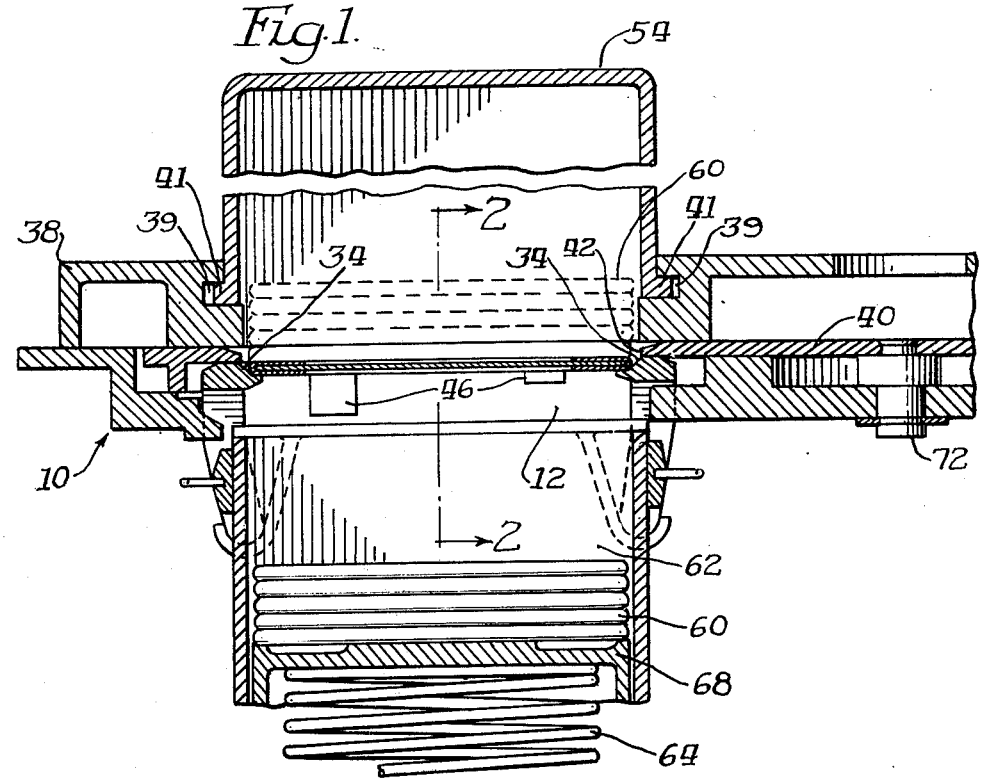
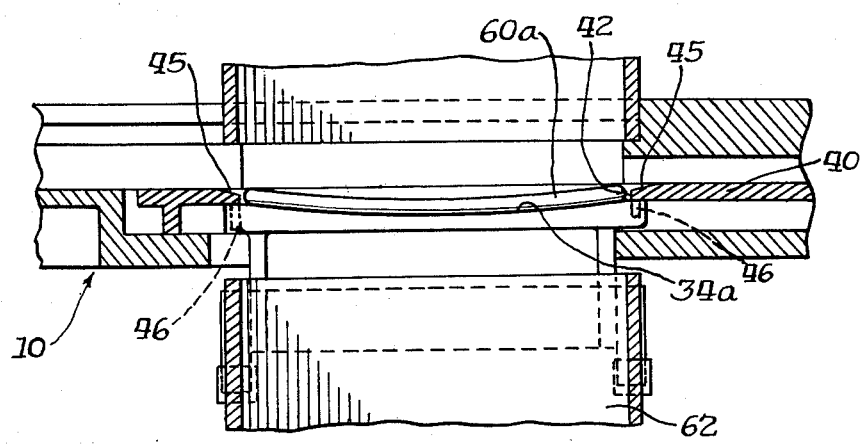

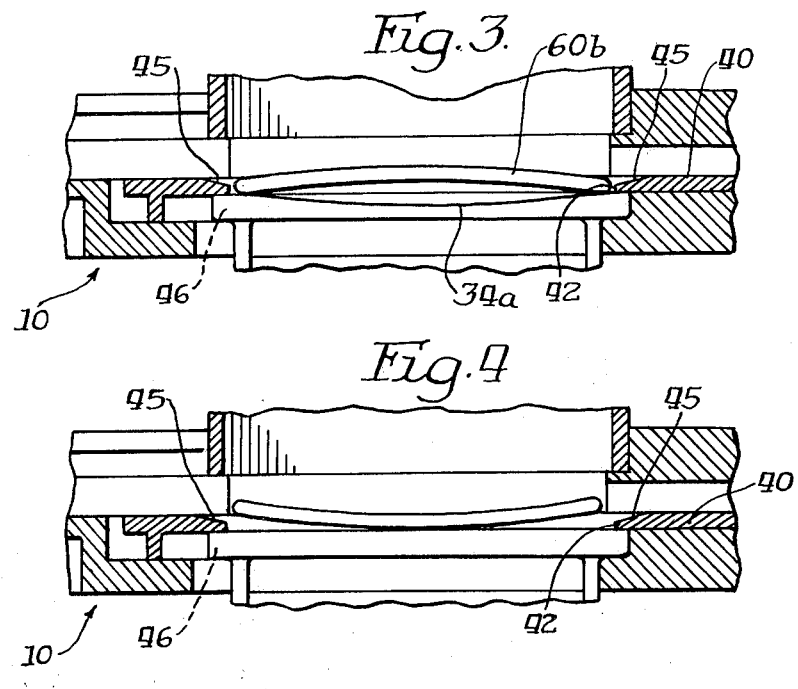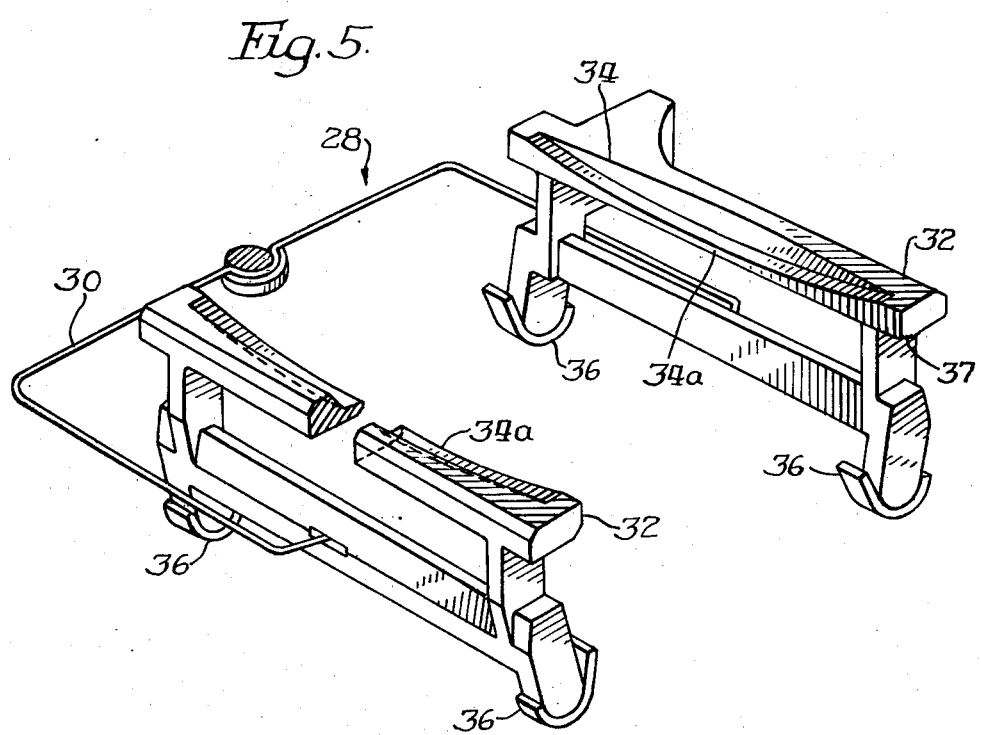

BOWED SLIDE HANDLING APPARATUS

BACKGROUND OF THE INVENTION

This invention relates generally to the field of slide projectors. More specifically, it relates to slide handling apparatus finding particular utility in the slide projector described in U.S. Pat. No. 3,659,934. That projector overcomes many prior art problems by presenting slides to projection apparatus in a horizontal plane. Horizontal orientation provides a convenient means for effecting previewing of a slide before actual projection. The complexity of the requisite apparatus is materially reduced and great increases in reliability manifest themselves. However, the development of novel slide transport apparatus of use the horizontal presentation approach encompasses a slide transport system that simply, economically and with a high degree of reliability presents a continuous supply of slides in a horizontal plane to operative stations of a slide projector.

The ability to tolerate bowed and warped slides has been a problem with those types of projectors since the drive plate which carries the slide from one operative station to the next has been found to jam if the edge of the slide juts above it. Many problems with slide shape result from excess humidity, poor storage, sloppy manufacturing, rough handling and general wear and tear. Recognizing that no two slides will have the same configuration particularly in cross-section, the present invention seeks to provide a technique which would effectively accomodate bowed slides even though the bowing was either upward or downward. There is no way of anticipating how the slides will be stacked before they are individually fed by the projector drive plate. Consequently, one slide may be bowed upwardly and the next downwardly. The mechanism herein solves the foregoing problem.

SUMMARY OF THE INVENTION

This invention has been developed to transport slides through four operative stations: entry, pre-viewing, projection, post-projection and finally returning to the entry station which serves as an exit station after the foregoing path has been traversed, thus its characterization as an entry-exit station. However, as will become more apparent herein there could be fewer or more operative stations if so desired. A platen with apertures corresponding to the above operative stations is provided. Only the aperture at the entry-exit station need be large enough to allow the passage of a slide. Horizontal transport surfaces at two levels are formed on the platen with an inclined plane portion communicating the two levels. A drive plate with four slide receiving apertures provides the motive power for moving the slides along the transport surfaces in a generally circular fashion.

The upper transport level provides transport surfaces for a slide resting thereon as the slide moves after entering the projector at the entry-exit station to the pre-viewing station and then to the projection station. Leaving the projection station the slide travels down a ramp or inclined plane to the lower level transport surface prior to positioning at the post-projection station. Continuing on the lower level the slide again reaches the entry-exit station, being located on the lower level the slide exits from the projection apparatus through the exit aperture.

A pair of spring biased arms overlying the exit aperture prevent a slide placed thereon when entering the projector from dropping through the aperture. The arms are so constructed that the slide passes under them when on the lower transport level and may then exit from the projection apparatus through that aperture. The upper horizontally disposed surfaces of the arms lie beneath the entry aperture and include reliefs which are adequate to accommodate a moderate amount of bowing in the slides. Each relief runs along an edge of an arm from one end to the other and is relieved to the greatest extent in the center, whereby the bowed slides can rest therein and present both leading and trailing slide edges in the plane of the drive plate. Consequently, the slide can be pushed in either direction. A plate-like upper surface overlying the path from the post-projection station to the arms at the entry-exit station provides a transport surface for a new slide resting on the arms when the normal sequence of operation reversed. Thereby the new slide will not fall to the lower surface during the reverse mode of operation, which prevents its exit during the next normal cycle.

Via slots in a housing overlying the projector, a supply cartridge of slides is slid horizontally into position over the spring urged arms. Underlying the exit aperture a vertical receiving chamber with a platform slideably located therein provides apparatus for collecting the viewed slides. After the slide supply is exhausted and slides are contained within the chamber, merely lifting the platform pushes the slides between and through the spring urged arms into the supply cartridge. Detent means hold the platform in its upper position where it remains until the slide supply cartridge is slid far enough so the platform no longer supports the slides. Inclined plane grooves formed in the upper surface of the platform cooperate with a like number of tabs, any number will suffice, extending downwardly from the supply cartridge. As the tabs are slid within the grooves ultimately a point is reached where the force applied by the tabs to the platform is sufficient to force it out of engagement with the detents whereupon it drops down into the receiving chamber.

BRIEF DESCRIPTION OF THE DRAWINGS

The features of the invention will become more apparent in the following detailed description and drawings wherein:

FIG. 1 is a partial slide cross-sectional view showing the entry-exit station and a slide resting on the arm reliefs;

FIG. 2 is a partial side cross-sectional view taken along line 2—2 of FIG. 1 and shows a slide bowed downward and resting in an arm relief;

FIG. 3 is a partial side cross-sectional view showing the entry-exit station and a slide resting on the arm relief where the slide is bowed upward;

FIG. 4 is a partial side cross-sectional view showing the entry-exit station and a bowed slide on the prior art type arm; and FIG. 5 is a perspective view of the arms of the present invention which includes the bowed slide reliefs.

DETAILED DESCRIPTION OF THE DRAWINGS

Referring to FIG. 1 the entry-exit station is shown including an exit aperture 12 in the center thereof. A retaining means 28, more detailed in FIG. 5, is positioned above the exit aperture 12, to prevent a supply of slides placed on its upper surfaces 34 from dropping through the exit aperture 12.

The retaining means 28 consists of two retaining arms 32 having a relieved upper-surface 34a and a bevelled under-surface 37 positioned by sockets 36 to permit rotational movement thereof and a spring 30 which urges elements 32 towards one another. The spring 30 urges the arms 32 together to the point that a slide may be placed in contact with both upper-surfaces 34. However, the retaining means must be constructed to allow sufficient separation of the retaining arms 32 to permit passage of a slide between them. The drive plate 40 moves slides along transport surfaces; it is a flat generally circular plate with four receiving apertures 42 and pushing tabs 46. Gear teeth about the entire circumference (not shown) are driven by a pinion. As seen in FIG. 1, the drive plate 40 is rotatably fastened above the platen 10 by a conventional fastener 72. A motor, not shown, drives the pinion which in turn drives gear teeth and the drive plate 40 is thusly rotated relative to base platen 10. The motor preferably is adapted to be driven in forward and reverse directions, thus permitting bi-rotational movement of the drive plate 40.

The tabs 46 are spaced to correspond to the gap between arms 32 and at least one tab on each side of each receiving aperture 42 extends far enough to contact the edge of a transparency even on the lower surface of the platen 10. The edges 45 of the receiving apertures 42 are bevelled to facilitate entry of a slide. The receiving apertures 42 are spaced substantially 90° from one another and coincide with the apertures in the platen 10 when they are in overlying relationship.

As best seen in FIG. 1, slides 60 are supplied to the transport apparatus from a supply cartridge 54 positioned over the upper surfaces 34 of retaining elements 32 by insertion into a housing 38 which overlies drive plate 40. The cartridge 54 is slid horizontally into position with its flanges 41 (FIG. 1) cooperating with grooves 39. Beneath the platen 10 and coincidental with the exit aperture 12, a receiving chamber 62 collects the slides 60 after projection. The shape of the supply cartridge 54 and the receiving chamber 62, as well as the shape of apertures 42, are slightly larger than and conform generally to the shape of the slides, in this case approximately square. However, it should be apparent that the shapes of the apertures are relatively immaterial so long as they permit entry of a slide and transferral of a slide from one to the other.

The device is ready for operation when the centers of slides 60 in the supply cartridge, an aperture 42 in the driving plate, the exit aperture 12 in the platen and the receiving chamber 62 are substantially coincidentally positioned. As seen in FIG. 1, a slide will be gravitationally urged against the upper surface 34 of elements 32 within a receiving aperture 42 of the drive plate 40.

Activation of drive to produce 90° of counter-clockwise rotation of drive plate 40 causes a single slide to be urged by the tabs 46 and the edges 45 of the receiving aperture 42 along the surfaces of the platen until the center of the slide substantially coincides with the center of the next or pre-viewing aperture (not shown).

To ensure that only a single slide, regardless of distortion (bow) will be carried by the receiving aperture 42, reliefs 34a are provided in the surfaces 34 of arms 32. Each relief is cut along the inner edge of the upper surface of an arm 32. In the preferred embodiment the relief is a radius cut from above such that the middle of the arm 32 is relieved to a depth of 1 mm. The radius is about 25.5 centimeters whereby the relief curves toward the upper surface 34 at a distance of 3 centimeters from the middle. The preferred width of the relief is 3 mm. The back of the relief can be chamfered at an angle of 45° to help in centering the slide upon the arms 32 and within the reliefs 34a.

FIGS. 2, 3 and 4 are important to the understanding and appreciation of the problem solved by the reliefs 34a. In FIG. 2 a downwardly bowed slide 60a is shown resting within the relief 34a of an arm 32. It is apparent that the edge of slide 60a is in alignment with drive plate 40 such that it can be moved to the next station without jamming between the housing 38 and the edge 45 of the drive plate 40. Slides with bowing of almost 1.5 mm have been moved without jamming in projector machines having the preferred embodiment reliefs.

It should be apparent that as the drive plate 40 is rotated through each 90° segment, a new slide will enter a receiving aperture 42 presented to the supply cartridge 54. Therefore, the presentation of slides to the projection aperture will be continuous until the slides 60 are exhausted from the supply cartridge 54.

The most frequent operating condition of the projector occurs after the drive plate 40 has been rotated counter-clockwise at least 360° and therefore all four receiving apertures 42 contain a slide coincident with the apertures of the base plate 10. More importantly, when the projector is tipped to direct the picture toward the screen the problem of a bowed slide can be accentuated since the slide will tend to favor (be positioned nearer) one edge 45 as it is gravity fed. Notwithstanding a tilt of up to 12° above horizontal and even with slides having 1.5 mm bows, the transport mechanism functioned properly.

FIG. 3 shows an upperwardly bowed slide 60b resting within reliefs 34a. Once again the end of the slide, is positioned such that the drive plate 40 can push the slide without riding thereunder. Any tendency to lift the slide 60b will be overcome by the natural inclination which the slide will assume as it is moved across the reliefs 34a. It should be appreciated that the criticality of the slide handling is greatest at the entry-exit station since the space between the housing 38 and the surfaces 34 is less there than at any other part of the slide transportation system.

Turning to FIG. 1, it is seen that a loading platform 68 and a spring 64 are contained within the receiving chamber 62. The loading platform 68 nestles slideably within the receiving chamber 62. The receiving chamber 62 defines a longitudinally extending orifice with substantially the same cross-sectional shape as that of the slides. The particular shape of the receiving chamber 62 is unimportant as long as it permits slides to enter freely and be positioned in a horizontal plane when their fall ceases. The loading platform 68 is free from the spring 64, the function of the spring 64 being merely to position the loading platform near the exit aperture 12 to reduce the distance a slide must fall to be supported by the platform.

The loading platform 68 in the receiving chamber 62 can be vertically moved after a given supply of slides has been exhausted and they are located in the receiving chamber 62. The slides can be ejected from the receiving chamber 62. The cooperation of the slidable loading platform 68 and the retaining means 28 rapidly accomplishes the desired ejectment. When the loading platform 68 is raised, the slides are urged against the bevelled surface 37 (FIG. 5) of the retaining arms 32 causing them to spread apart and permitting passage of the slides. When the platform 68 reaches its uppermost position all of the slides are again contained within the slide cartridge 54 and the cartridge may be removed by sliding it out of grooves 39.

That the particular shape of the slide and thus the corresponding apertures could easily be changed from what has been described for illustration purposes should be apparent.

Thus apparatus which provides a convenient means for handling slides within a slide projector has been described. It should be obvious that many modifications and alterations of the embodiments above-described may be made without departing from the spirit and scope of the invention as set forth in the appended claims.

What is claimed is:

1. An apparatus for controlling the movement of slides in a plane substantially normal to the direction of the movement comprising:
   means for receiving a supply of slides having an upper portion for storage and dispensing of photographic slides and a lower portion for accumulating them and a line between said portions of said means lying perpendicular to the photographic surface of the slides;
   unidirectional means disposed between said upper and lower portions normal to said line and said unidirectional means including a pair of movable support surfaces in spaced apart relation positioned to engage opposite edges of a photographic slide along their upper distal segments of said surfaces for supporting the parallel extremities of a photographic slide; and
   relief means disposed along said distal segments for permitting substantial conjugate disposition in juxtaposed relation of non-planar photographic slides having the central portion thereof curved out of the general plane thereof.

2. The apparatus of claim 1 wherein said central displacement is in the range of one to two times the thickness of a slide and said relief means is cut on a radius from a center spaced from the middle of said distal segment to thereby extend the length of the slide along the conjugating juxtaposed edge.

3. The apparatus of claim 1 wherein said relief means includes a chamfered portion between the relief and the surfaces of the unidirectional means to guide and center photographic slides substantially within and generally conjugated to said relief for maintaining the leading and trailing edges between the opposed edges in a plane.

4. The apparatus of claim 1 wherein said unidirectional means includes a bevelled underside adapted to cam said means as slides are raised from said lower portion to said upper portion.

5. The apparatus of claim 4 wherein said support surfaces are mounted for pivotal movement towards and away from each other in response to a spring member and said camming respectively.

* * * * *